United States Patent [19]
Van Selus

[11] 3,727,698
[45] Apr. 17, 1973

[54] LIFT AND CARRIER TRAILER APPARATUS

[76] Inventor: Samuel H. Van Selus, Echo, Minn. 56237

[22] Filed: Oct. 9, 1970

[21] Appl. No.: 79,564

[52] U.S. Cl. ............... 172/439, 172/491, 172/605, 214/501, 280/461 A
[51] Int. Cl. ............................................ A01b 59/043
[58] Field of Search ............... 172/452, 605, 467, 172/491, 479, 463, 439; 214/86 A, 501, 518, 130 R, 132; 280/461, 462

[56] References Cited

UNITED STATES PATENTS

| | | | |
|---|---|---|---|
| 2,786,589 | 3/1957 | Garrett | 172/491 X |
| 3,598,260 | 8/1971 | Hutson | 280/461 A |
| 3,263,822 | 8/1966 | Weinman | 214/132 X |

Primary Examiner—Robert E. Pulfrey
Assistant Examiner—Stephen C. Pellegrino
Attorney—Dugger, Peterson, Johnson & Westman

[57] ABSTRACT

Trailer apparatus for hauling wide width implements, for example three-point hitch cultivators, having a trailer body, a turntable mounted on the rear left of the body to pivot about a vertical axis, arms adapted to be attached to the lower two hitch points of the implement mounted on the turntable for pivotal movement about a horizontal axis, a piston cylinder combination pivotal mounted on the turntable, linkage mechanism operated by the expansion of said combination for pivoting said arms and second linkage mechanism pivotally mounted on the frame and adapted to be attached to the upper third hitch point to pivot the implement to elevate its rear end portion relative its front end portion as the arms are pivoted to lift the front of the implement. A horizontally and vertically adjustable support member is provided for supporting a part of the weight of the implement when the turntable has been pivoted from its implement pickup to its implement road travel position.

22 Claims, 6 Drawing Figures

PATENTED APR 17 1973

INVENTOR.
SAMUEL H. VAN SELUS
BY
Dugger Peterson Johnson & Westman
ATTORNEYS

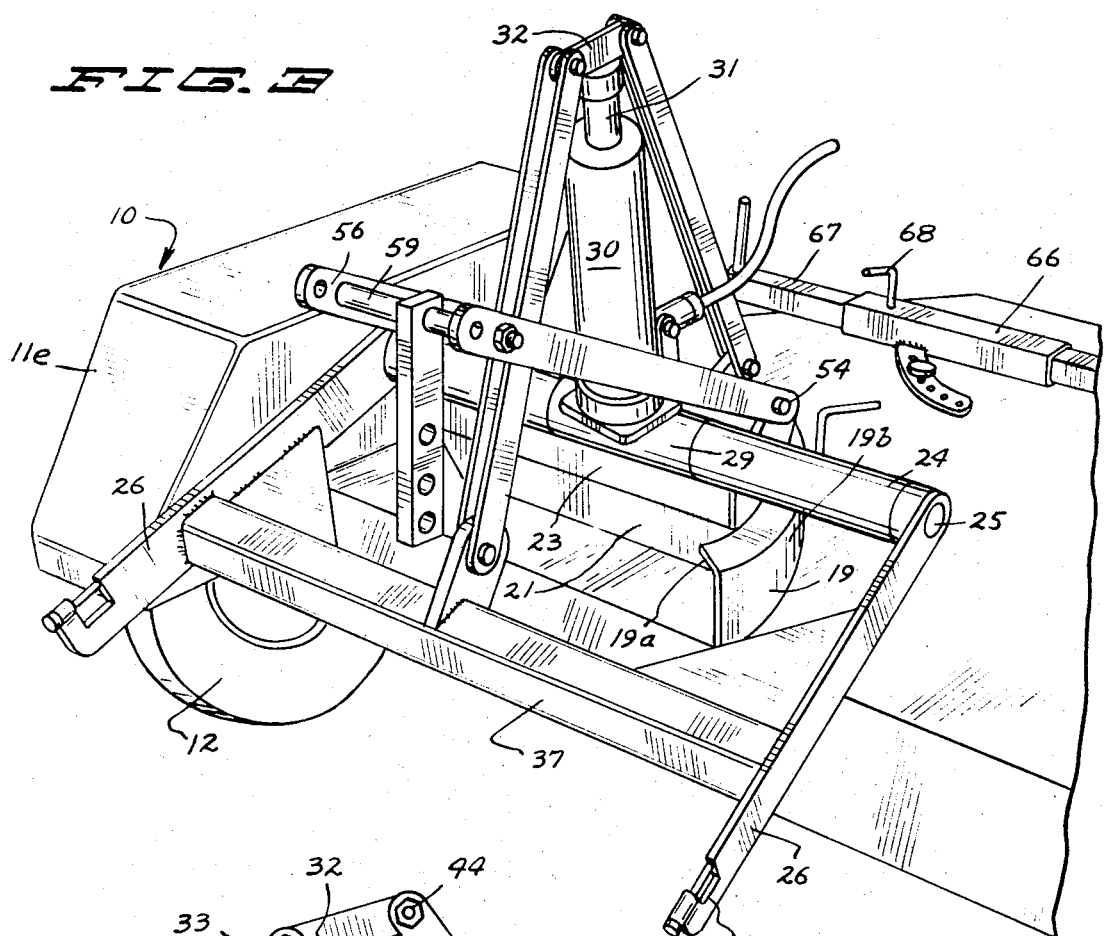

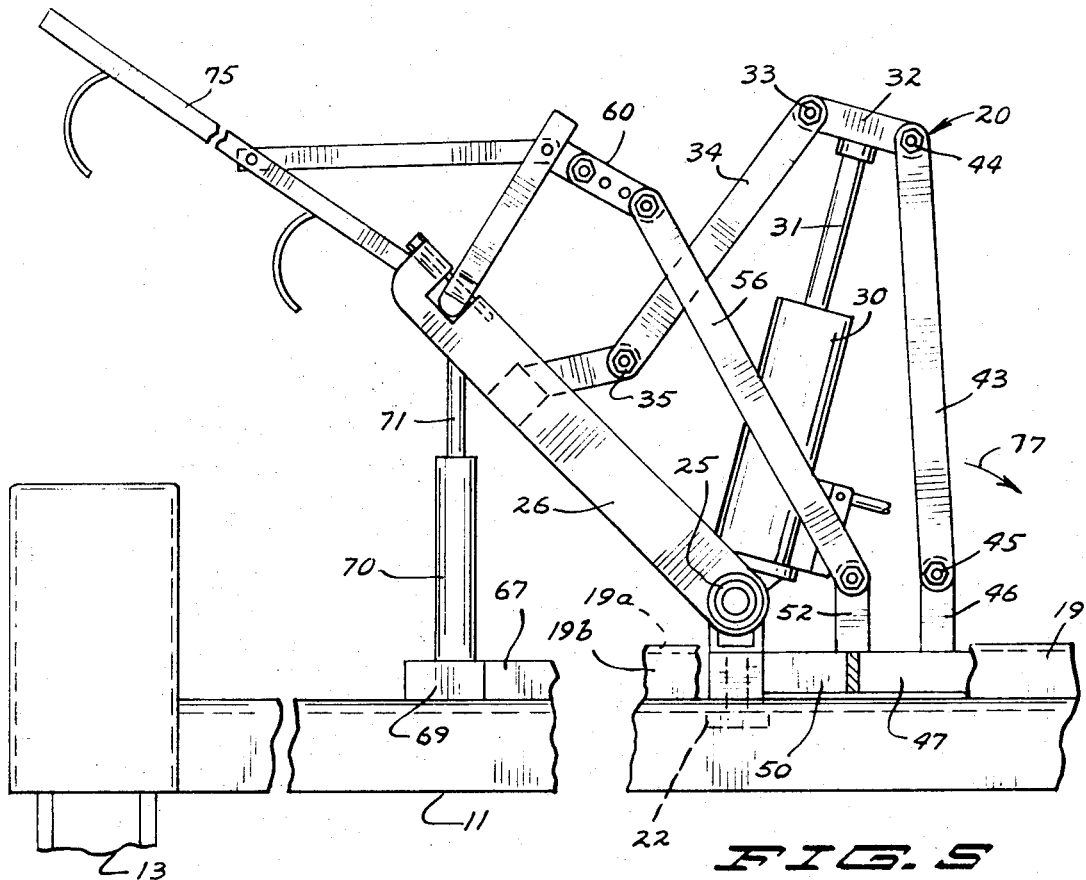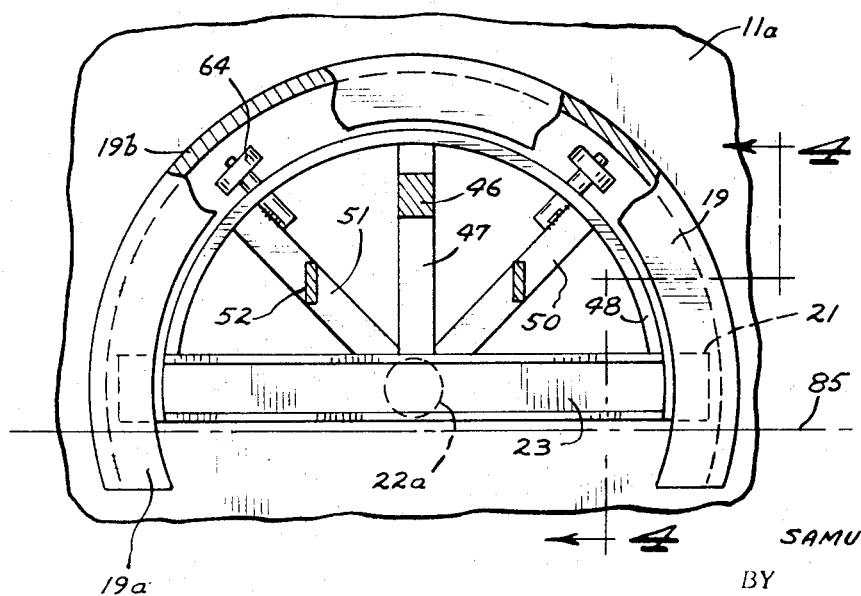

3,727,698

LIFT AND CARRIER TRAILER APPARATUS

BACKGROUND OF THE INVENTION

Trailer apparatus having a turntable on a trailer and an implement lift and support assembly mounted on the turntable.

Many farm implements such as three-point hitch planters, cultivators and etc., are very wide, for example 20 feet wide in a direction transverse to the direction the implement is to be pulled across the field in normal use and 5 feet in length. Such an implement is too wide to be pulled down a public road in its normal direction of travel.

In the prior art it is old to mount a turntable on a trailer to have a vehicle that has a length in its normal direction of travel greater than its width driven onto a turntable extended generally at right angles to the trailer body and then rotate the turntable relative the trailer body so that the length dimension of the turntable extends in the same direction as the trailer body. Further it is old to provide a pair of wheels that are secured to the longest dimension of the implement that are lowered to permit the implement being transported in a direction rotated 90° from its normal travel direction (see for example U.S. Pat. No. 2,996,307 to De Bailleux).

The first mentioned type of prior art apparatus requires that the implement be moved up a ramp and thence onto the turntable, or lifted by a separate vehicle onto a turntable, and that the turntable be at least the same length as the longitudinal spacing of the wheels of the vehicle. The first mentioned type of prior art apparatus would require a turntable of larger dimensions than are practical for an over the road trailer (and thus there is no practical advantage in using such prior art apparatus) for hauling implements having a width dimension greater than its fore and aft dimension in its normal direction of travel. As to the second type of prior apparatus, this requires that the vehicle travel on a road surface which may be satisfactory for relatively short distances in the country, but is not satisfactory for longer distances. In order to solve problems of the above mentioned nature and other problems, this invention has been made.

SUMMARY OF THE INVENTION

Trailer apparatus having a trailer body, a turntable mounted on the body for rotation about a vertical axis, and an implement lift and support assembly mounted on the turntable for movement therewith and movement relative thereto for lifting an implement and supporting the implement in an elevated condition, said assembly being adapted for carrying three-point hitch agriculture implements.

One of the objects of this invention is to provide new and novel trailer apparatus for lifting, for example, three-point hitch agricultural implements with the width dimension extending in one direction and carrying the implement over the road with the width dimension extending at approximately right angles to the first mentioned direction. Another object of this invention is to provide new and novel trailer apparatus for liftingly pivoting an implement about a first axis and pivoting the implement about a second axis parallel to the first axis as the implement is being lifted.

BRIEF DESCRIPTION OF THE DRAWINGS

FIG. 3 is an enlarged, fragmentary perspective rear view of the turntable lift and support assembly in an implement pick-up position, and the adjacent portion of the trailer;

FIG. 4 is an enlarged fragmentary view of the lift and support assembly in the position of FIG. 1, part of said view being shown in vertical cross section; said view being generally taken along the line and in the direction of the arrows 4—4 of FIG. 6;

FIG. 5 is an enlarged fragmentary view of a turntable lift and support assembly in an implement support, road travel position; and FIG. 6 is a fragmentary horizontal, cross sectional view generally taken along the line and in the direction of the arrow 6—6 of FIG. 4 to show the mounting and construction of the turntable.

Referring to FIG. 1, the apparatus of this invention, generally designated 10, includes a trailer body 11 having left and right wheels 12 and 13 rotatably attached thereto and a forwardly extending drawbar 14. A third wheel assembly 15 is mounted by the crank member 16 on the drawbar whereby turning the hand crank, the elevation may be varied.

Figure 1:
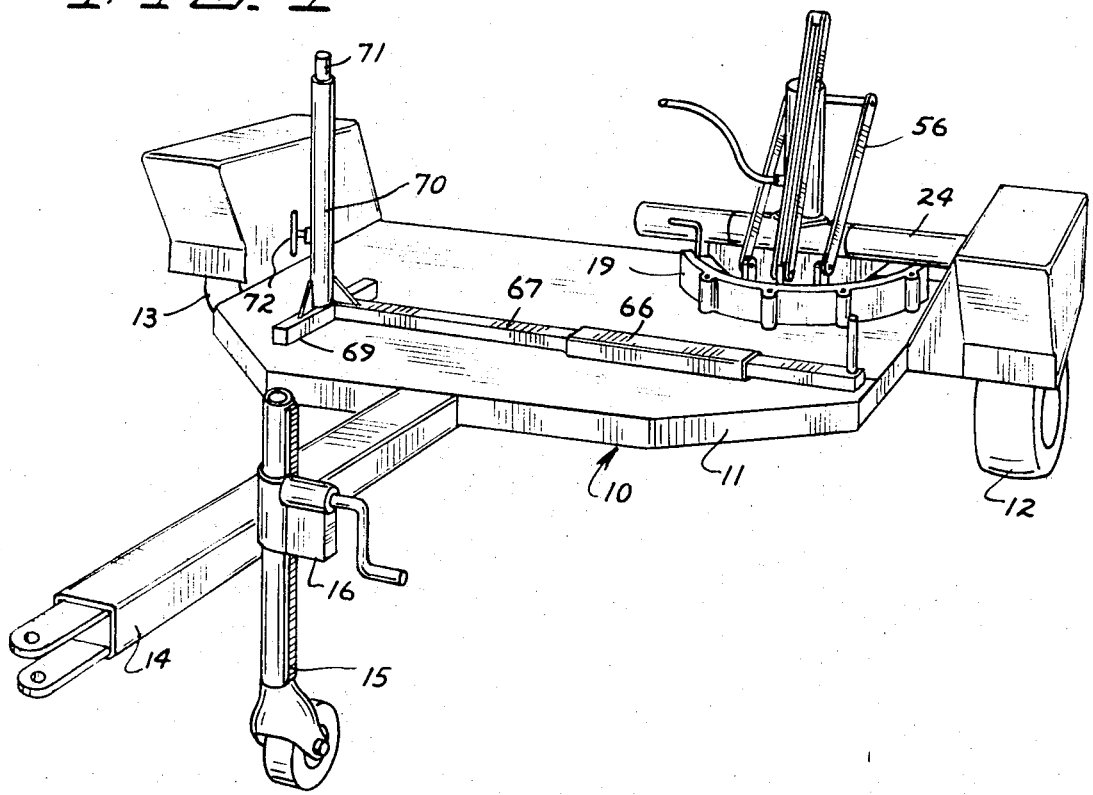
FIG. 1 is a front perspective view of the trailer apparatus of this invention with the turntable lift support assembly in a datum implement pick-up position.
Figure 2:
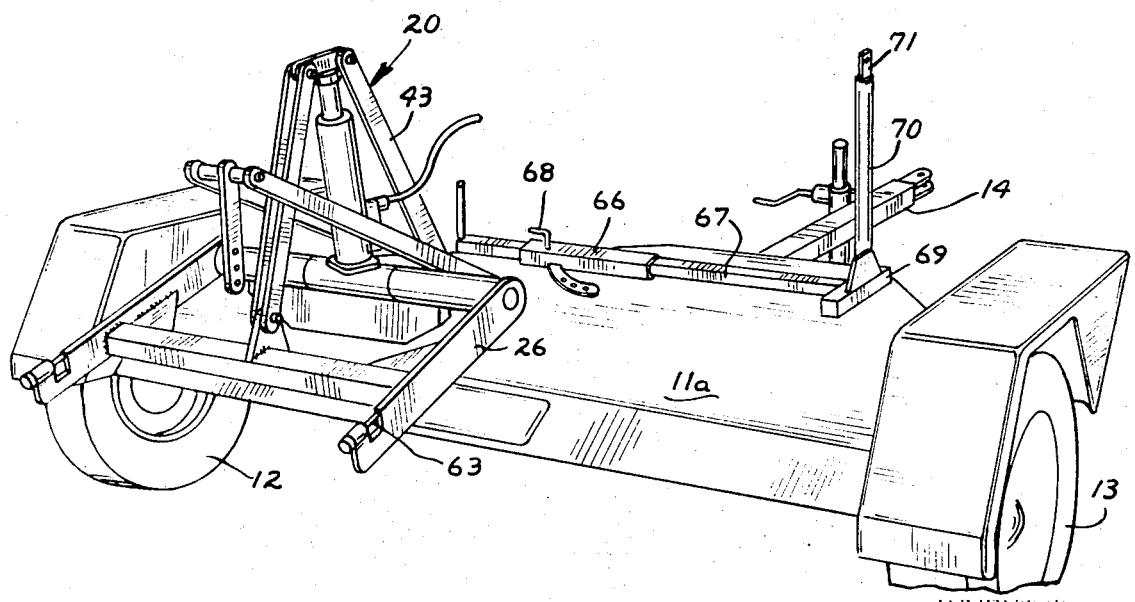
FIG. 2 is a rear perspective view of the apparatus of FIG. 1 with the lift support assembly in the same position as shown in FIG. 1.

Mounted on the left rear portion of the trailer body is an arcuate support 19 that extends through an angle greater than 180°, but less than 270° to open rearwardly. The support has a vertical flange 19b and a top, generally horizontally inwardly extending flange 19a that is spaced a substantial distance above the floor 11a of the trailer body. Mounted by the trailer body floor and support 19 for rotary movement about a vertical axis is a turntable implement lift and support assembly, generally designated 20. The assembly 20 includes a horizontally elongated bar 21 that is of a length less than the diameter of support flange 19b. A suitable bearing and pivot member 22 mounts the bar 21 on the floor to pivot about pivot member 22a that has a vertical axis that is co-extensive with the center of curvature of flange 19b. A pair of horizontal tubes 24 are mounted on the horizontal channel 23 to be in axial alignment, substantially spaced from one another, and located at a higher elevation than flange 19a; channel 23 being mounted on bar 21 to pivot therewith. The tubes rotatably mount a horizontal shaft 25 that extends outwardly of the remote ends of the tubes 24, each end of the shaft 25 having the one ends of the elongated bars 26 fixedly attached thereto to extend outwardly therefrom at the same angle.

A tubular member 29 is pivotally mounted on shaft 25 intermediate tubular members 24, tubular member 29 mounting the one end of the cylinder 30 of a piston cylinder combination 30,31 to extend radially outwardly therefrom. The aforementioned piston cylinder combination includes a piston rod 31 that mounts a cross head 32 to extend perpendicular to the axis of elongation of the piston rod. It is to be understood that a screw jack could be used in place of said combination 30,31, however, it is preferred that said combination be used.

One end of the cross head 32 mounts the pivot member 33 which in turn pivotally mounts the one ends of a pair of elongated links 34. The opposite ends of link 34 are pivotally connected at 35 to a bracket 36 which in turn is mounted on the intermediate portion of a horizontal channel 37. The channel 37 extends between bars 26 and is welded thereto at positions more clearly adjacent the ends of the bars having slots 39 than the ends that are secured to shaft 25. Bar 37 is mounted in parallel relationship to shaft 25. The end of the cross head opposite pivot member 33 mounts a pivot member 44 in parallel relationship to pivot member 33. The one ends of a pair of elongated links 43 are pivotally mounted by the pivot member 44 while the opposite ends are pivotally connected at 45 to a bracket 46. The lower end of bracket 46 is mounted to a radially extending frame member 47 at a location remote from the vertical pivot 22a. Links 43 are of a greater length than links 34.

The one ends of horizontal brace 47 is attached to the center of bar 21 to extend perpendicular thereto while the other end is attached to a semi-circular vertical flange 48. The terminal ends of flange 48 are welded to the end portions of bar 21, the radius of curvature of flange 48 being substantially less than the radius of curvature of flange 19b. Angularly intermediate brace 47 and one end portion of bar 21 is a second radially extending brace 50 while angularly intermediate the opposite end portion of the bar 21 and brace 47 is a second brace 51. Each of braces 50,51 has one ends attached to bar 21 adjacent brace 47 and opposite ends to flange 48, braces 50,51 mounting upwardly extending brackets 52 that are located radially more closely adjacent pivot member 22a than bracket 46.

Each of the brackets 52 mounts a pivot member 54 to pivot about a horizontal axis co-extensive with the other pivot member 54. The pivot axis of the pivot members 54 are parallel to the pivot axis of tubular member 29 and pivot members 33 35, 44 and 45.

Each pivot member 54 pivotally mounts the one end of an elongated link 56, the opposite ends of the links having a plurality of apertures 57 for mounting the bolt 59 in selected radial spaced positions from pivots 54. The bolt 59 mounts the one end of the attachment bar 60, to pivot about an axis parallel to shaft 25, the opposite end of the attachment bar having a plurality of spaced apertures 61.

Angularly spaced wheels 64 are mounted by flange 48 to rotate about horizontal axes that pass through pivot member 22a. The wheels 64 are mounted intermediate flanges 48,49 in a position to rotatably bear against the under surface of flange 19a to aid in retaining the angular intermediate portion of flange 48 closely adjacent the trailer floor. Wheels 64 are mounted such that at least one is abuttable against flange 19a even when the turntable is rotated 90° from the implement pick-up position.

Mounted on the trailer floor forward of arcuate support 19 is a horizontal, rectangular tubular member 66 which has an elongated slide bar 67 slidably extended therethrough. Bar 67 is provided with a plurality of horizontally spaced, vertical apertures (not shown), while tube 66 is provided with an aperture through which pin 68 is extended, the pin being extended into one of the apertures of bar 67 for retaining bar 67 in an adjusted position relative tube 66. The end of the bar 67, remote from the side of the trailer floor on which the turntable assembly is mounted, has a horizontal crossbar 69 mounted thereto to rest on the trailer floor. The lower end of a vertical tube 70 is mounted on the center portion of cross piece 69. Tube 70 telescopically mounts a tube 71, there being provided a pin 72 for adjustably retaining tube 71 in various selected vertical elevations.

The turntable lift and support assembly in an implement pick-up position of FIG. 4 is located on the rear, left-hand half of the trailer with the pivot axis of pivot member 22a being slightly ahead of the axis of rotation 85 of wheels 12,13. In the pick-up position, the slotted end portions of parallel arms 26 are located rearwardly of the trailer, the axis of pivotal movement of shaft 25 being parallel to axis of rotation 85 of wheels 12,13 at this time. Preferably the maximum width of the trailer is 8 feet.

Using the apparatus of this invention, with the piston cylinder combination in its retracted position and the turntable rotated to the implement pick-up position, such that arms 26 extend rearwardly, the trailer is backed up to the implement 75 to be hauled such that the axis of rotation 85 of wheels 12,13 is generally parallel to the width dimension of the implement and the slotted ends of arms 26 are adjacent the lower two hitch points of the implement. Pins 63 are withdrawn and arms 26 moved so that the two lower hitch points are located in slots 39 and then pins 63 repositioned to retain the lower two hitch points in the slots while permitting said hitch points pivoting in the slots. The apertured end of bar 60 is attached to the upper third hitch point of the implement whereby the hitch bar 60 may pivot relative to the implement. Now fluid under pressure is applied to the lower end of cylinder 30 whereupon the cross head 32 is moved radially away from the pivot axis of shaft 25. Since the position of pivot member 45 is fixed relative to the turntable, this movement of the cross head results in links 43 being pivoted in the direction of the arrow 77 about pivot member 45 and the cross head and piston cylinder combination pivoted in the direction of the arrow 78 relative the axis of shaft 25. The aforementioned radial and pivotal movement of the cross head, through links 34, pivot arms 26 in the direction of the arrow 78 about shaft 25 to elevate the slotted ends of bars 26.

Initially, since the spacing of the top hitch point from the attachment of the arms to the lower two hitch points is fixed, the aforementioned elevating movement of the slotted ends of arms 26 result in links 56 being pivoted in the direction of the arrow 79 about pivot members 54. In this connection it is to be noted that the attachment of the implement to bars 26 and bar 60 is horizontally on the opposite side of shaft 25 from the pivot axis of pivot members 54 and 45.

Further the linear distance from the pivot axis of shaft 25 to the lower two hitch points is less than the sum of the distances between the pivot axis of members 54,59 and the third hitch point and bolt 59. At the time bar 60 is attached to the third hitch point, the downwardly opening included angle of links 56 and bar 60 is less than 180°. As a result of the relative locations of the pivot members, the shaft pivot axis, the length of the links and the spacing of slots 39 from shaft 25, the rearward end portion of the implement 75 is elevated more rapidly than the forward end portion whereby in the length direction the implement is inclined. After the implement is elevated to an elevation to avoid striking the fenders 11e of the trailer when the turntable assembly is rotated, the application of additional fluid under pressure to the lower end of the cylinder is discontinued and while the cross head is retained in its elevated position relative the cylinder, the turntable (for example by pushing on bars 26) is rotated about the pivot axis of pivot member 22a whereby the elongated width dimension of the turntable extends generally fore and aft with the implement in part in overhanging relationship to the right-hand half trailer. That is, at this time, the implement extends over the right-hand portion of the trailer and depending on the longitudinal dimension of the implement, in part extends to the right of the trailer. Now tube 67 is horizontally adjustably positioned relative tube 66 and the elevation of tube 71 is adjusted relative tube 70 to the proper elevation to have the upper end of the tube 71 attached to a frame member of the implement. Tubular members 71,70 support the tubular frame intermediate the mid-portion thereof and the now forward end of the implement. A chain (not shown) has one end attached to the forward end of the implement (on the opposite side of tube 70 from arm 26) and the opposite end attached to the drawbar to aid in retaining the implement in a generally horizontal position in a fore and aft direction of the trailer and inclined upwardly in a transverse direction toward the right of the trailer.

What is claimed is:

1. Trailer apparatus for a wide width implement comprising a trailer having a trailer body, a turntable mounted on said body for rotation about a vertical axis located nearer to one side of said body, hitch means adapted to be attached to spaced portions of the implement to elevate and supportingly carrying the implement said hitch means including a pair of arms, said arms having first end portions mounted on the turntable for pivotable movement about a common horizontal axis and horizontally spaced second end portions adapted to be supportingly connected to the implement, first means mounting the hitch means on the turntable for movement therewith and relative thereto between an implement pickup position and an elevated implement carry position, and second means on the turntable and connected to the hitch means for moving the hitch means between its positions when the implement is attached to the hitch means said implement in its elevated position being swingable generally over the other side of said trailer body.

2. The apparatus of claim 1 further characterized in that the hitch means includes a hitch bar having a first end portion and a second end portion adapted to be connected to the implement at a higher elevation than the arms second end portions and that the hitch bar is mounted for pivotal movement about a horizontal axis parallel to the said common axis.

3. The apparatus of claim 1 further characterized in that said second means includes a piston cylinder combination having a cylinder and a piston rod, the cylinder being mounted on the turntable for pivotal movement about a horizontal axis and the piston rod being connected to said arms for pivoting the arms about said common axis as the piston rod is moved between an expanded condition and a retracted position.

4. Trailer apparatus for a wide width implement comprising a trailer having a trailer body, a turntable mounted on said body for rotation about a vertical axis, hitch means including a pair of arms having first end portions mounted on the turntable for pivotable movement about a common horizontal axis and horizontally spaced second end portions adapted to be supportingly connected to an implement to be carried, said hitch means including a hitch bar having a first end portion and a second end portion adapted to be connected to the implement at a higher elevation than the arms second end portion, said hitch bar being mounted for pivotal movement about a horizontal axis parallel to said common axis, first means mounting said arms on the turntable for movement therewith and relative thereto between an implement pickup position and an elevated implement carry position, second means including a piston cylinder combination having a cylinder and piston rod, the cylinder being mounted on the turntable for pivotal movement about a horizontal axis and the piston rod being connected to said arms for pivoting the arms about said common axis as the piston rod is moved between an expanded position and a retracted position, a common horizontal shaft, and means for mounting said shaft for pivotal movement, said shaft providing said common axis and said axis of pivotal movement of the cylinder to render said common axis and cylinder axis of pivotal movement coextensive, that said arm first end portions are attached to the shaft in axial spaced relationship to one another, and that the cylinder is mounted on the shaft for pivotal movement relative the shaft between the arms first end portions.

5. The apparatus of claim 4 further characterized in that the second means includes a cross head attached to the piston rod to move therewith, a first link having a first end portion and a second end portion, the first link first end portion being pivotally connected to the cross head, and the first link second end portion being pivotally connected to the arms intermediate the arms first and second end portions.

6. The apparatus of claim 5 further characterized in that the second means includes a second link having a first end portion and a second end portion, the second link first end portion being pivotally connected to the cross head and the second link second end portion being pivotally connected to the turntable on the opposite side of the piston cylinder from where the first link second end portion is connected to said arms.

7. The apparatus of claim 6 further characterized in that the hitch means includes a hitch bar adapted to be pivotally connected to the implement and that the first means includes an elongated third link having a first end portion and second end portion, the third link first end portion being pivotally connected to the hitch bar and the third link second end portion being pivotally connected to the turntable intermediate where the first link second end portion is pivotally connected to the arms and said common axis.

8. The apparatus of claim 6 further characterized in that the turntable is rotatably mounted on the turntable body through an angle of about 90° from said implement pick-up position to a position in which the implement is parallel to the direction in which the trailer apparatus travels along the road and means on the frame adapted to supportingly hold at least a portion of an implement attached to the hitch means when the hitch means is in an implement carry position and the turntable is in said road travel position.

9. The apparatus of claim 8 further characterized in that the trailer has a pair of transverse spaced wheels rotatably mounted on the trailer body, that the turntable is mounted on the rear portion of the left half of the trailer body, that said last-mentioned means includes an upwardly extending implement support member on the front right half of the trailer body and that the turntable pivot axis is horizontally closely adjacent the trailer wheel axis of rotation.

10. Trailer apparatus for carrying an implement, for example a three hitch point agricultural implement that has a transverse width substantially greater than its length in its normal direction of travel in use, comprising a trailer that includes a trailer body having a rear portion that has a rear edge, hitch means adapted for being connected to the implement for elevating and carrying the implement, a turntable mounted on the trailer body for rotation of about 90° about a vertical axis between an implement pick-up position and a position in which the implement is parallel to the direction in which the trailer apparatus travels along the road, and first means mounted on the turntable for rotation therewith and movement relative thereto connected to said hitch means for moving at least part of the hitch means between a lowered datum position extending rearwardly of the rear edge portion when the turntable is in its pick-up position and an elevated implement carry position that the implement is higher than the turntable when the hitch means is attached to the implement, said hitch means including a pair of elongated arms having first end portions adapted to be attached to the lower two hitch points of a three hitch point implement, second means for mounting the arms on the turntable to pivot about a horizontal axis remote from the arms first end portions, and means on said turntable adapted to be attached to the upper hitch point of the three hitch point implement.

11. The apparatus of claim 10 further characterized in that the first means includes a piston cylinder combination having a piston rod and a cylinder, third means for mounting the cylinder on the turntable for pivotal movement about a horizontal axis and fourth means connecting the piston rod to the arms for movement relative the arms and moving the arms between the implement pick-up position and the implement carry position.

12. The apparatus of claim 10 further characterized in that the trailer has a pair of transversely spaced trailer body support wheels mounted on the trailer body rear portion for rotation about a transverse axis and a vertical pivot member mounted on the trailer body supporting said turntable on a vertical pivot axis ahead of the transverse axis.

13. The apparatus of claim 10 further characterized in that the turntable is of a size and shape and mounted on the trailer body to be substantially located on the left half portion of the trailer body.

14. Trailer apparatus for carrying an implement, for example a three hitch point agricultural implement that has a transverse width substantially greater than its length in its normal direction of travel in use, comprising a trailer that includes a trailer body having a rear portion that has a rear edge, hitch means adapted for being connected to the implement for elevating and carrying the implement including an upper third hitch point attachment bar, a turntable mounted on the trailer body for rotation of about 90° about a vertical axis between an implement pick-up position and a position in which the implement is parallel to the direction in which the trailer apparatus travels along the road, and first means mounted on the turntable for rotation therewith and movement relative thereto for moving at least part of the hitch means between a lowered datum position extending rearwardly of the rear edge portion when the turntable is in its pick-up position and an elevation implement carrying position that the implement is higher than the turntable when the hitch means is attached to the implement, said hitch means including a pair of elongated arms having first end portions adapted to be attached to the lower two hitch points of a three hitch point implement and including a link bar having one end portion pivotally connected to said attachment bar and a second end portion, and second means for mounting the arms on the turntable to pivot about a horizontal axis remote from the arms first end portions, and means connecting said link bar second end portion to the turntable for pivotal movement about a horizontal axis parallel to the axis of pivotal movement of the arms, said bar and link being of relative length and the link being pivotally connected to the turntable at a location to maintain the third hitch point at a higher elevation than the lower two hitch points when the arms are attached to the implement and moved to their elevation position for carrying said implement.

15. The apparatus of claim 14 further characterized in that the first means includes a piston cylinder combination having a cylinder and a piston rod, a cross head attached to the piston rod to move therewith, a second link having a first end portion pivotally connected to the arms intermediate the arm first end portion and the arm pivot axis and a second end portion pivotally connected to the cross head, a third link having a first end portion pivotally connected to the cross head on the opposite side of the piston rod from the pivotal connection of the second link to the cross head and a second end portion pivotally connected to the turntable, the pivotal connections of the second and third links having horizontal pivot axes parallel to the arm pivot axis, the third link pivotal connection to the turntable being on the opposite side of the cylinder from the pivotal connection of the second link to the arms and that the second means mounts said cylinder for pivotal movement about an axis coextensive with the arm pivot axis.

16. Trailer apparatus for a wide width implement comprising a trailer having a trailer body with a wheel at each side thereof and a drawbar extending forwardly therefrom, hitch means adapted to be attached to spaced portions of the implement to elevate and supportingly carry the implement, means on said trailer body adjacent one side thereof and nearer one of said wheels connected to and mounting said hitch means for angular movement between an implement pick-up position at the rear of said body and an implement carry position generally above the other side of said body, said mounting means including a turntable mounted on said body for rotation about a generally vertical axis and further including a horizontal shaft carried by said turntable to provide a horizontal axis about which a portion of mounting means is also supported for pivotal movement thereabout.

17. The apparatus of claim 16 including power means on said turntable connected to a second portion of said mounting means for causing said pivotal movement.

18. The apparatus of claim 17 further characterized in that said shaft is located above said turntable.

19. The apparatus of claim 18 further characterized in that said mounting means includes a pair of horizontal tubular members fixedly attached to said turntable and a third tubular member intermediate said pair of tubular members, said shaft extending through said three tubular members, and said power means including a cylinder having one end attached to said third tubular member, said third tubular member being rotatable on said shaft.

20. The apparatus of claim 19 further characterized in that said power means includes a piston rod projecting from said cylinder, and said mounting means includes a link pivotally connnected at one end to said turntable and pivotally connected at its opposite end to said piston rod, said mounting means further including a second link pivotally connected at one end to said hitch means and pivotally connected at its opposite end to said piston rod.

21. The apparatus of claim 20 further characterized in that said hitch means includes a pair of elongated bars fixedly attached at one end to the ends of said horizontal shaft and having their other ends adapted to be attached to laterally spaced lower portions of the implement, and a horizontal member extending between said bars at a location spaced from said shaft, said one end of said second link being pivotally connected to said transverse member.

22. The apparatus of claim 21 including a third link pivotally connected at one end to said turntable at a location to the rear of said shaft and inclining upwardly and forwardly to a location above said horizontal member, and a hitch bar pivotally connected at one end to the other end of said third link and having its other end adapted to be attached to an upper portion of the implement.

* * * * *